(12) United States Patent
Hashimoto (10) Patent No.: US 7,212,365 B2
(45) Date of Patent: May 1, 2007

(54) SERVO WRITER

(75) Inventor: Akihiro Hashimoto, Odawara (JP)

(73) Assignee: FujiFilm Corporation, Tokyo (JP)

( * ) Notice: Subject to any disclaimer, the term of this patent is extended or adjusted under 35 U.S.C. 154(b) by 30 days.

(21) Appl. No.: 10/995,407

(22) Filed: Nov. 24, 2004

(65) Prior Publication Data

US 2005/0152059 A1 Jul. 14, 2005

(30) Foreign Application Priority Data

Jan. 13, 2004 (JP) .............................. 2004-004930

(51) Int. Cl.
  *G11B 5/09* (2006.01)
  *G11B 27/36* (2006.01)
  *G11B 15/46* (2006.01)
  *G11B 21/02* (2006.01)
(52) U.S. Cl. ........................... 360/53; 360/31; 360/51; 360/73.04; 360/75
(58) Field of Classification Search ................ None
  See application file for complete search history.

(56) References Cited

U.S. PATENT DOCUMENTS 3,582,743 A * 6/1971 Diaz et al. .................. 388/816
5,402,271 A * 3/1995 Kaminaga et al. ............. 386/65
5,663,845 A * 9/1997 Yamamoto et al. ........ 360/73.11
6,441,985 B1 * 8/2002 Gill .......................... 360/73.04

FOREIGN PATENT DOCUMENTS

| JP | 2000011347 A | * | 1/2000 |
| JP | 2003-141836 A | | 5/2003 |
| JP | 2003141836 A | * | 5/2003 |

OTHER PUBLICATIONS

Electronic translation of JP 2003-141836.*

* cited by examiner

*Primary Examiner*—William Korzuch
*Assistant Examiner*—Daniell L. Negrón
(74) *Attorney, Agent, or Firm*—Sughrue Mion, PLLC (57) ABSTRACT

Disclosed is a servo writer when, detecting an abnormality from servo signals written on a tape-shaped recording medium, such as a magnetic tape, corrects the abnormality through a simplified procedure, thereby allowing for an increase in the transport speed of media in the future. The servo writer includes a write head for writing servo signals, a verifying head positioned downstream of the write head in a transport direction of the tape, for reading the servo signals written by the write head in order to inspect the servo signal, an inspection section for checking whether or not the servo signals being read by the verifying head contain any abnormality, and an overwrite head positioned downstream of the verifying head in the transport direction, for overwriting a portion where the abnormality is detected by the inspection section.

12 Claims, 6 Drawing Sheets

SERVO WRITER

BACKGROUND OF THE INVENTION

1. Field of the Invention

An apparatus consistent with the present invention relates to a servo writer for writing servo signals on tape-shaped recording media such as a magnetic tape, which checks whether or not the servo signals are written successfully, and corrects an abnormality if detected, such as a writing error. More specifically, an apparatus consistent with the present invention relates to a servo writer which corrects an abnormality without eliminating it from the medium, thereby preventing the waste of media.

2. Description of the Related Art

Figure 6:
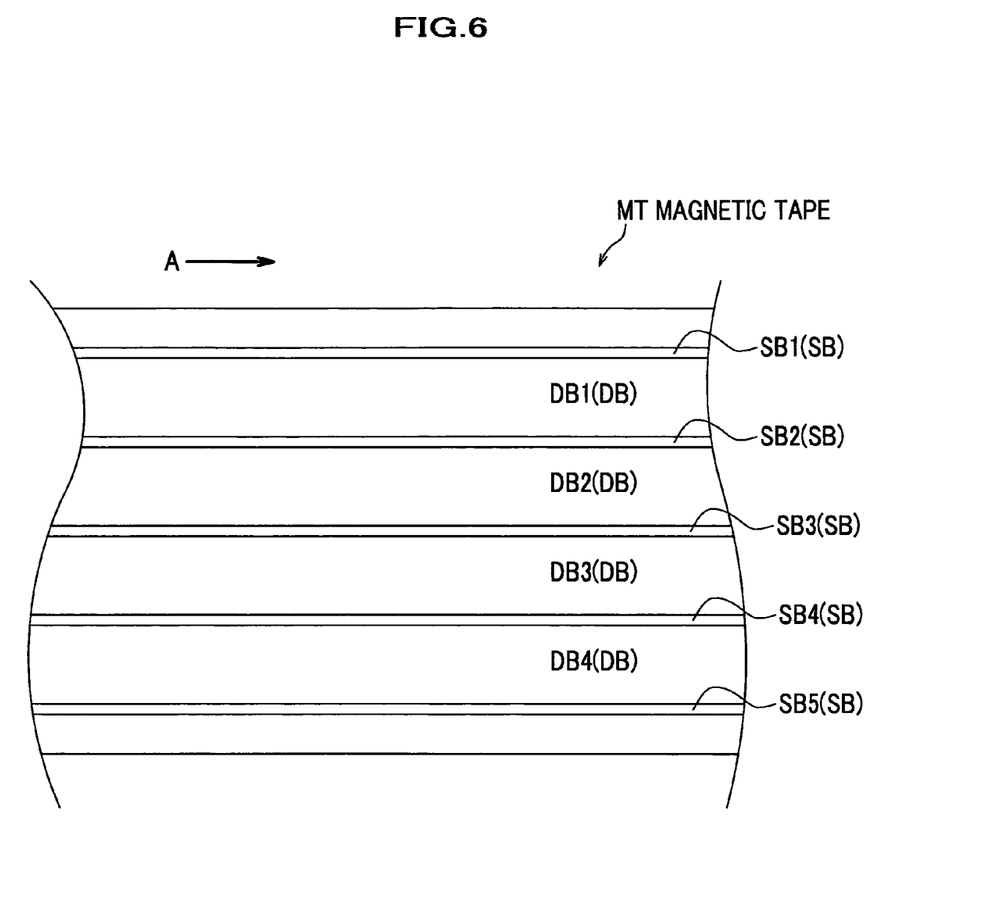
FIG. 6 is a view depicting an arrangement of various bands on the magnetic tape.

Conventionally, tape-shaped recording media such as magnetic tapes have been used as external recording media for computers, etc. Referring to FIG. 6, in order to increase its recording density, a large number of data bands DB each containing data are formed on a magnetic tape MT along the width (vertical direction in this figure). For example, four data bands DB1, DB2, DB3 and DB4 are formed as a set of data bands DB in FIG. 6. Each of the individual data bands DB1 to DB4 is further divided into multiple fine bands (not shown). Recently, each data band is being narrowed to increase the total number of the data bands, so that the recording density is further increased.

However, the magnetic tape MT continues to move slightly in its lateral direction while being transported, for various reasons. Inevitably, as the data band is narrowed, it is more difficult for a recording/reproducing head of a recording/reproducing system (not shown) to completely trace the data band. To overcome this disadvantage, servo signals are written on a magnetic tape prior to using. Then, the recording/reproducing system dynamically controls the position of the recording/reproducing head relative to the magnetic tape by using the servo signals during the record/reproduction stage. Specifically, the system uses its servo signal reading head to read from the magnetic tape, then senses the amount of the lateral displacement of the recording/reproducing head relative to the magnetic tape, and finally makes fine-movement of it in accordance with the sensed amount. As a result, the displacement is compensated. Note that, in the recording/reproducing system of this type, the servo signal reading head and the recording/reproducing head are integrated.

The servo signals are written on the servo bands SB1 to SB5 (see FIG. 6) of the magnetic tape MT in the transport direction (i.e. the direction of an arrow A) by using a dedicated servo writer.

A conventional servo writer is constituted as follows:

(a) a supply reel which feeds a magnetic tape;
(b) a write head which writes a servo signal on the magnetic tape;
(c) a verifying head positioned downstream of the write head, which inspects the servo signal; and
(d) a take-up reel that winds the magnetic tape.

Since the servo signal written by this servo writer is used as a reference for controlling the position of the recording/reproducing head, the servo signal must be written correctly without any absent and superfluous parts.

Therefore, the servo writer checks whether or not the servo signals are written successfully on the magnetic tape, by using its verifying head, after writing the servo signals with its write head. If an abnormality is detected, then the servo writer cuts the abnormal part off the magnetic tape to correct it. However, this process eventually ends up wasting the magnetic tape.

To eliminate this waste, this inventor conceived another servo writer. This servo writer, if an abnormality is detected, erases the abnormality, then rewrites a new servo signal on the erased part, and checks whether or not the servo signal is written successfully, by using a re-verifying head positioned downstream of the verifying head (see Japanese Unexamined Patent Application No. 2003-141836 (paragraphs 0012 to 0030, FIG. 1)).

This servo writer can eliminate the cutting process, thereby preventing the waste of the magnetic tape.

However, it can be expected that the transport speed of magnetic tapes will have been increased in the future. In order to follow this trend, a simplification of the procedure for correcting the abnormality is in demand.

The present invention has been conceived in order to meet the above demand. An object of the present invention is to provide a servo writer which adopts a simplified procedure for correcting abnormalities of servo signals written on tape-shaped recording media, thereby allowing for an increase in the transport speed of media in the future.

SUMMARY OF THE INVENTION

According to an aspect of the present invention, there is provided, a servo writer for writing a servo signal on a tape, the servo writer including a supply reel for feeding the tape, and a take-up reel for winding the tape, the servo writer including:

(a) a write head for writing the servo signal on the tape;
(b) a verifying head for reading the servo signal written by the write head in order to inspect the servo signal, the verifying head being positioned downstream of the write head in a transport direction of the tape;
(c) an inspection section for checking whether or not the servo signal being read by the verifying head contains an abnormality; and
(d) an overwrite head for overwriting, with a new servo signal, a portion where the abnormality is detected by the inspection section, the overwrite head being positioned downstream of the verifying head in the transport direction of the tape.

In the servo writer above, the write head writes the servo signal on the tape, the verifying head then reads it, and the inspection section checks whether or not the servo signal is written successfully. If the inspection section detects any abnormality from the servo signal, then the overwrite head overwrites the abnormality with a new servo signal. Note that "abnormality" means the absent or superfluous part of the servo signal due to a writing error.

With this servo writer, even if the inspection section detects the abnormality, it is not erased but directly overwritten with a new servo signal, in contrast to a conventional type servo writer.

Consequently, the procedure for correcting the abnormality is simplified, thereby making it possible to provide a servo writer capable of being adapted for an increase in the transport speed of the medium in the future.

The servo writer further includes:

(a) a re-verifying head for reading the servo signal written by the overwrite head in order to inspect the servo signal, the re-verifying head being positioned downstream of the overwrite head in the transport direction of the tape; and (b) a re-inspection section for checking whether or not the servo signal being read by the re-verifying head contains an abnormality.

In this servo writer, the re-verifying head reads the servo signal overwritten by the overwrite head, and the re-inspection section then checks whether or not the servo signal is written successfully. Consequently, it is possible to provide tapes to which the servo signals are written with high reliability.

The servo writer further includes an overwrite controller for determining timing of overwriting the servo signal, based on the transport speed of the tape and a distance between the verifying head and the overwrite head. In this case, the overwrite head overwrites the servo signal under the control of the overwrite controller.

The arrangement above makes it possible to ensure the phase compensation of the servo signal overwritten, thus achieving the high reliable overwriting operation and providing the high reliable tapes.

Further, the write head, the verifying head and the overwrite head are integrated.

With this head structure, the positional accuracy between the verifying head and the overwrite head is improved. Specifically, the verifying head can exactly read the servo signal written by the write head, as well as the overwrite head can overwrite, with a new servo signal, the abnormality on the servo signal of the tape, if detected.

In conclusion, the provision of the servo writer according to the present invention makes it possible to simplify the overwriting procedure for correcting abnormalities if detected, such as writing error, of servo signals written on tapes. Consequently, it is possible to provide a servo writer capable of being adapted for an increase in the transport speed of tapes.

BRIEF DESCRIPTION OF THE DRAWINGS

For more complete understanding of the present invention and the advantages hereof, reference is now made to the following description taken in conjunction with the accompanying drawings wherein.

DETAILED DESCRIPTION OF THE EXEMPLARY EMBODIMENTS OF THE INVENTION

Figure 1:
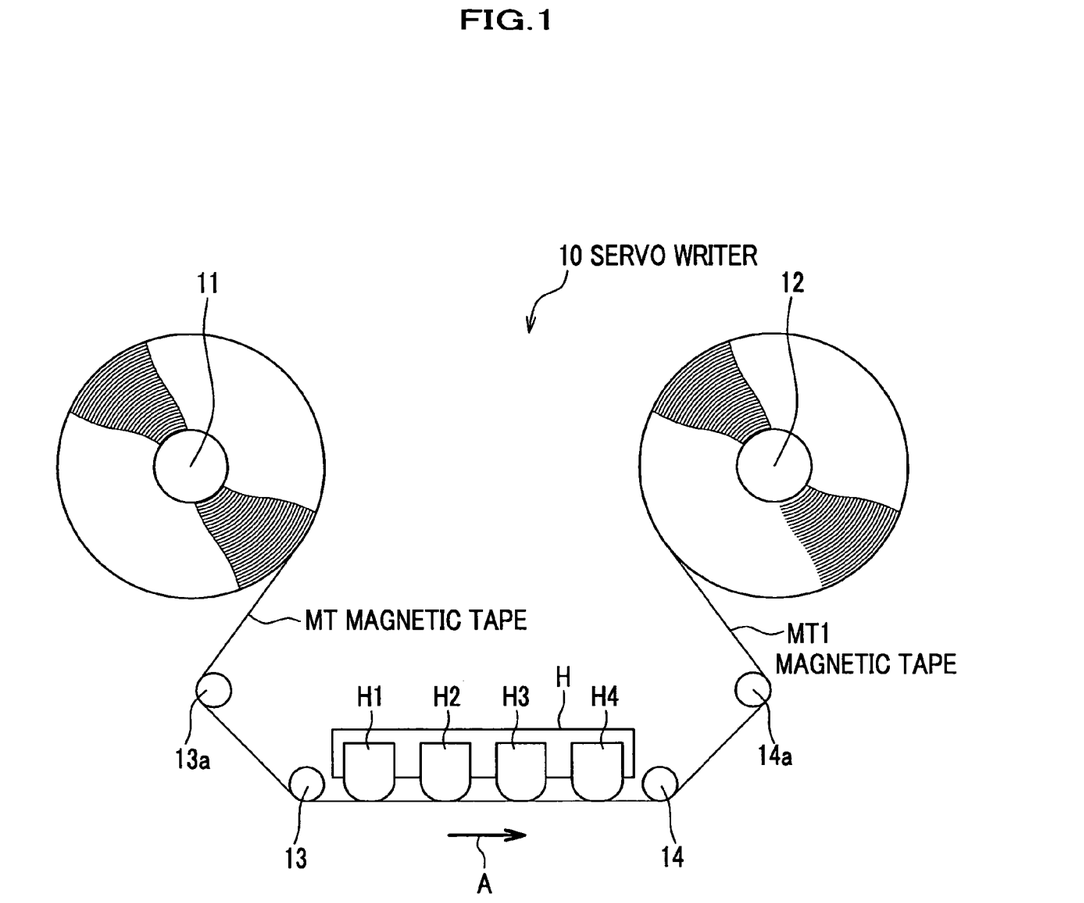
FIG. 1 is a conceptual elevation view depicting a servo writer according to an embodiment of the present invention.

A description will be given in detail below of an embodiment of the present invention, with reference to the accompanying drawings. FIG. 1 is a conceptual elevation view depicting a servo writer according to an embodiment of the present invention. Referring to FIG. 1, a servo writer 10 includes a supply reel 11 and a take-up reel 12 and, further includes a write head H1, a verifying head H2, an overwrite head H3, and a re-verifying head H4 which are all arranged between the supply reel 11 and the take-up reel 12. The individual heads H1, H2, H3 and H4 are integrated into a head unit H, so that the high positional accuracy of the three heads H2, H3 and H4 relative to the write head H1 is ensured. This servo writer 10 writes servo signals on a magnetic tape MT, and these servo signals are used so that an external storage for computers, such as a tape drive, servo-controls the position of its recording/reproducing head relative to the magnetic tape MT.

The supply reel 11 is positioned upstream of the head unit H in the transport direction of the magnetic tape MT, and has the blank magnetic tape MT wound therearound. The supply reel 11 is rotated by a servo motor (not shown) at a predetermined rotational frequency, feeding the magnetic tape MT to the head unit H at predetermined speed.

The take-up reel 12 is positioned downstream of the re-verifying head H4 in the transport direction, and is rotated by a servo motor (not shown) at a predetermined rotational frequency, winding the magnetic tape MT1 at a predetermined speed to which the servo signals have been written by the write head H1 and the overwrite head H3.

Upstream and downstream of the head unit H, capstan rollers 13 and 14 are arranged, respectively. The magnetic tape MT is also transported by the rotation of these capstan rollers 13 and 14. In other words, the magnetic tape MT fed from the supply reel 11 is transported in the direction of the arrow A in the figure by the rotation of the servo motors (not shown) and the rotation of the capstan rollers 13 and 14, while being guided by the guide rollers 13a and 14a.

The servo writer 10 adjusts the tension of the magnetic tape MT and transports the magnetic tape MT at an appropriate speed, thereby ensuring that the servo signals are written on the magnetic tape MT. Accordingly, the servo writer 10 includes a tape tension controller that adjusts the tension of the magnetic tape MT and a tape transport controller that adjusts the transport speed of the magnetic tape MT to a predetermined value, which are both not shown in FIG. 1.

Figure 2:
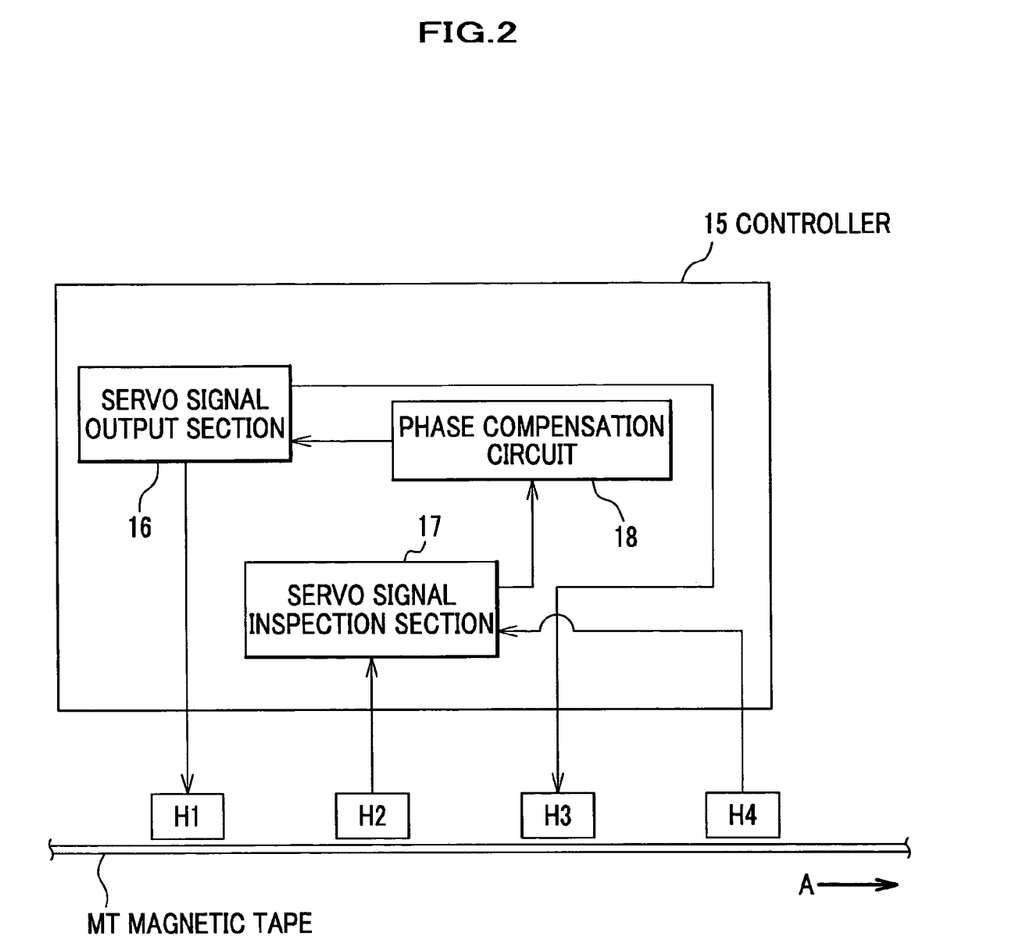
FIG. 2 is a block diagram illustrating a conceptual configuration of the servo writer.

Next, a description will be given below of the write head H1, the verifying head H2, the overwrite head H3, and the re-verifying head H4. FIG. 2 is a block diagram illustrating the servo writer 10. Referring to FIG. 2, the individual heads H1 to H4 write servo signals on the magnetic tape MT, reads them therefrom, overwrites them, and reads them therefrom, respectively, under the control of a controller 15.

Figure 3A:
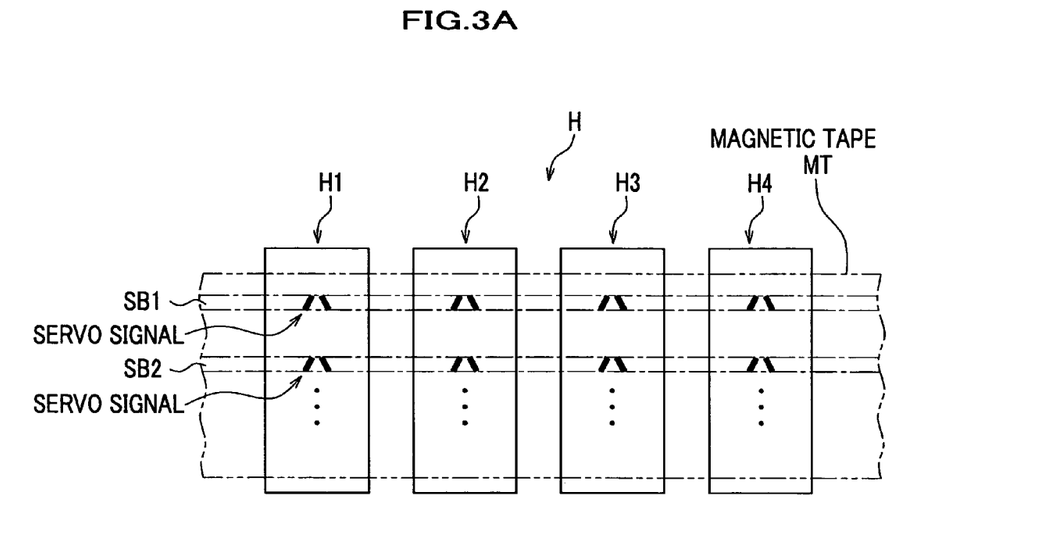
FIG. 3A is a view depicting a condition of a servo signal written on a magnetic tape.
Figure 4:
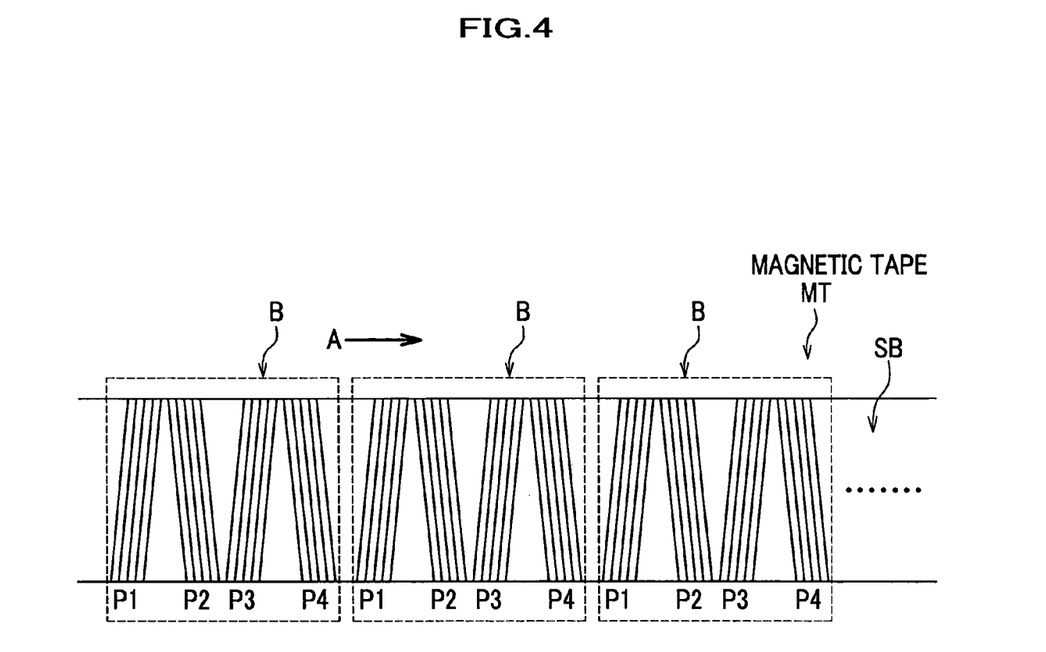
FIG. 4 is a view depicting a configuration of the servo signal.

The write head H1 receives servo signals having predetermined patterns outputted from the servo signal output section 16 of the controller 15 and, then writes them on corresponding servo bands SB1, SB2 etc. (see FIG. 3A). The servo signal represents a reference signal having specific patterns which is written on the magnetic tape MT in the transport direction, and includes pattern blocks B, each composed of patterns P1 to P4 inclined at a predetermined angle with respect to the transport direction (e.g. the direction of the arrow A), as shown in FIG. 4. The pattern blocks B are continuously written lengthwise on each servo band SB of the magnetic tape MT, thus constituting the servo signal.

The verifying head H2 (see FIG. 1) reads the servo signals from the respective servo bands SB1, SB2, etc. (see FIG. 3A) of the magnetic tape MT and, then outputs the servo signals to a servo signal inspection section 17 of the controller 15, as shown in FIG. 2. The servo signal inspection section 17 compares the servo signals received from the verifying head H2 and predetermined patterns stored within beforehand and, thereby checks whether or not the servo signals contain any abnormality (thereinafter, referred to as "writing error"). The writing error of the servo signal is detected in the case where some patterns of the servo signal are absent due to a writing error, or when undesired superfluous patterns are contained in the servo signal. The writing error occurs due to defects of materials of the magnetic tape MT or vibrations of the magnetic tape MT upon writing of the servo signals, for example.

The overwrite head H3 overwrites the pattern block B in error with a new pattern block B, if the servo signal inspection section 17 detects the writing error of the servo signal. In this case, the new servo signal to be written by the overwrite head H3 is outputted from the servo signal output section 16. It is preferable that the overwriting operation above is done for each pattern block B. The servo signal inspection section 17 serves as both an inspection section and a re-inspection section herein.

The overwrite operation above is done under the control of a phase compensation circuit 18 (overwrite controller). The phase compensation circuit 18 sets the timing when the servo signal output section 16 outputs the servo signals, so that the overwrite head H3 exactly overwrites the pattern block B in error with the new pattern block B. The phase compensation circuit 18 starts monitoring the phase of the servo signal already written on the magnetic tape MT, when receiving, from the servo signal inspection section 17, a new pattern block B with which the pattern block B in error of the servo signal is overwritten. After confirming that the phase of the written servo signal reaches to a predetermined phase, the phase compensation circuit 18 delivers a control signal to the servo signal output section 16 so as to send the new pattern block B to the overwrite head H3. In response to this control signal, the servo signal output section 16 sends the new pattern block B to the overwrite head H3. In this case, the predetermined phase detected by the phase compensation circuit 18 is determined based on the transport speed of the magnetic tape MT and the distance between the verifying head H2 and the overwrite head H3. Note that the transport speed of the magnetic tape MT may be recorded beforehand on the servo writer as a data value, or may be detected by a detector (not shown) in real-time. In this case, the transport speed may be derived from the rotation of the capstan rollers 13 and 14. This makes it possible to detect the transport speed in real time, even if the speed changes, for example, at the start or end of winding, thereby achieving overwriting operation in accordance with the variation in the transport speed.

The re-verifying head H4 reads the servo signals from the magnetic tape MT, and outputs them to the servo signal inspection section 17 as is the case with the verifying head H2. The servo signal inspection section 17 compares the servo signals received from the re-verifying head H4 and predetermined patterns recorded thereon beforehand and, thereby checks whether or not the servo signals contain any writing error.

Next, a description will be described below of the processes by which the servo writer 10 writes the servo signals to the magnetic tape MT. Note that the individual heads H1 to H4 are operated under the control of the controller 15.

First, the write head H1 receives the servo signals of a predetermined pattern from the servo signal output section 16, and then writes them to the corresponding servo bands SB1, SB2, etc. (see FIG. 3A).

Subsequently, the verifying head H2 reads the servo signals from the magnetic tape MT and, then outputs them to the servo signal inspection section 17. The servo signal inspection section 17 checks whether or not the servo signals contain any writing error.

Figure 3B:
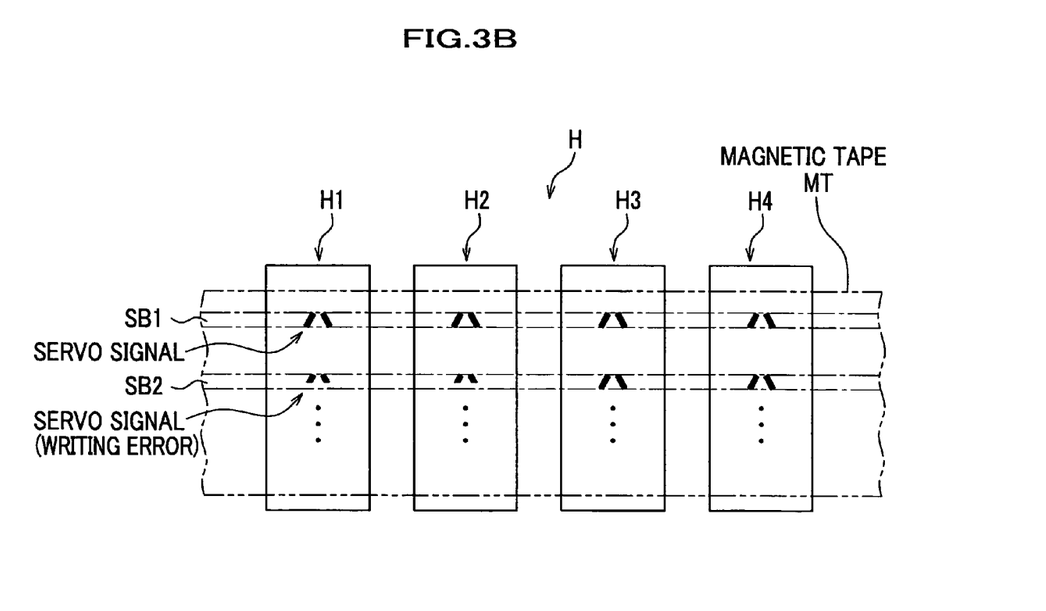
FIG. 3B is a view depicting a condition of a servo signal written on a magnetic tape.

In this case, if the servo signal inspection section 17 does not detect any writing error (see FIG. 3A), then the overwrite head H3 does not perform the overwriting operation and the re-verifying head H4 does not perform the re-verifying operation, either. Otherwise, if detected (see FIG. 3B), then the magnetic tape MT is fed as it is, and the overwrite head H3 overwrites the pattern block B in error with a new pattern block B.

Figure 5A:
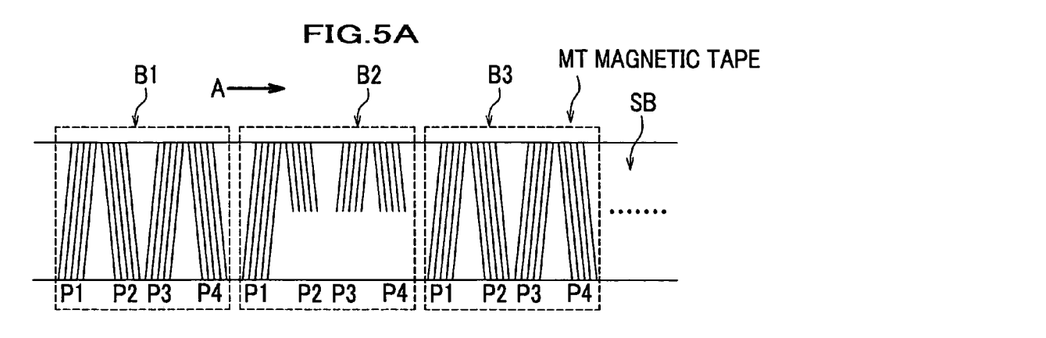
FIG. 5A is a view explaining an overwriting operation.
Figure 5B:
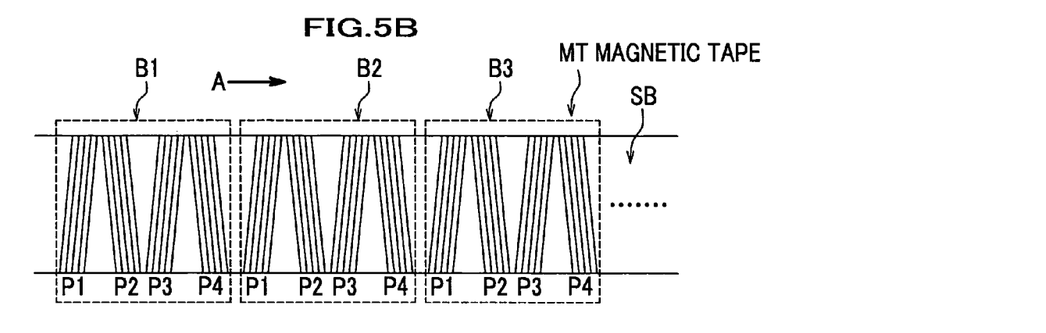
FIG. 5B is a view explaining the overwriting operation.
Figure 5C:
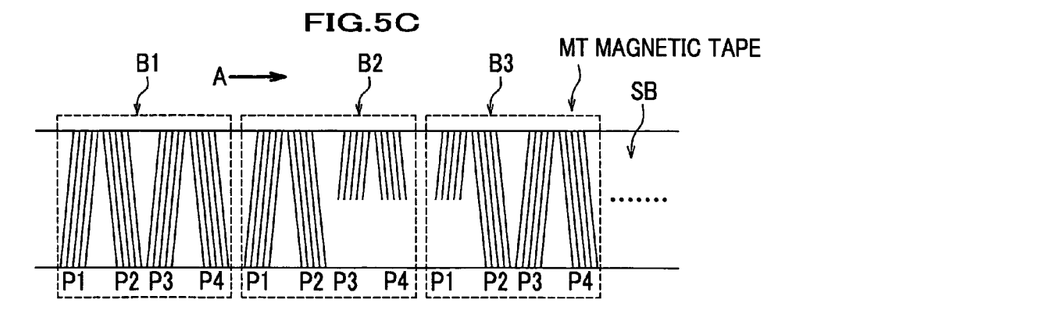
FIG. 5C is a view explaining the overwriting operation.
Figure 5D:
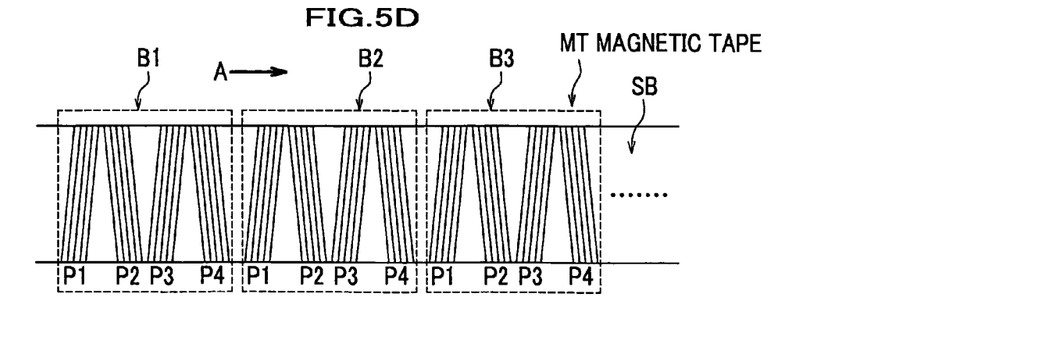
FIG. 5D is a view explaining the overwriting operation.

Referring to FIG. 5A, assuming that the writing error occurs in a pattern block B2 because of a writing error, the servo signal output section 16 allows the overwrite head H3 to overwrite the whole of the pattern block B2 where the writing error is detected, under the control of the servo signal inspection section 17 through the phase compensation circuit 18. In this way, the correction of the servo signal is completed (see FIG. 5B). Referring to FIG. 5C, when the writing error occurs across the two pattern blocks B2 and B3, the servo signal output section 16 allows the overwrite head H3 to overwrite the whole of both the pattern blocks B2 and B3. In this way, the correction of the servo signal is completed (see FIG. 5D).

Subsequently, the re-verifying head H4 reads the servo signal having been overwritten on the magnetic tape MT by the overwrite head H3 and, then outputs it to the servo signal inspection section 17. The servo signal inspection section 17 checks whether or not the servo signal being read by the re-verifying head H4 contains any writing error. Should the writing error be detected from the servo signal, the part of the writing error is eliminated by being cut off the magnetic tape MT.

With the servo writer 10 described above, the part of the writing error can be corrected by overwriting it, even if the servo signal on the magnetic tape MT contains any writing error. This enables the decrease in the failure of the magnetic tape MT so that the manufacturing yield thereof is increased.

In addition, the servo writer 10 above directly overwrites the servo signals without erasing the part of the writing error, thereby simplifying the procedures after the writing error is detected. As a result, the servo writer 10 can be sufficiently adapted for the increase in the transport speed of the magnetic tape in the future.

Further, the re-verifying head H4 reads the servo signals having been written by the overwrite head H3, and the servo signal inspection section 17 then checks whether or not the servo signals have been written successfully. This can allow the magnetic tape MT1 to be of a high degree of reliability (see FIG. 1).

Under the control of the phase compensation circuit 18, the timing of overwriting the servo signal is set based on the transport speed of the magnetic tape MT and the distance between the verifying head H2 and the overwrite head H3, and the overwrite head H3 performs the overwriting operation in accordance with the timing being set. Accordingly, the serve signals can be overwritten without causing an out of phase, thus achieving high reliable overwriting operation. Consequently, the magnetic tape MT1 having a high degree of reliability (see FIG. 1) can be provided.

Since the write head H1, the verifying head H2, the overwrite head H3 and the re-verifying head H4 are integrated, the high positional accuracy of the heads H2 to H4 with respect to the write head H1 can be ensured. In other words, the verifying head H2 can read the servo signals having been written on the magnetic tape MT by the write head H1, with great precision, then the overwrite head H3 can exactly overwrite the part of the writing error, if detected, with a new servo signal, and finally the re-verifying head H4 can surly read the overwritten servo signal. As a result, the reliability of individual operations of the servo writer 10 is improved.

Note that the write head H1, the verifying head H2, the overwrite head H3 and the re-verifying head H4 are provided into the head unit H in this embodiment, but they may be formed separately from one another. Alternatively, each of the verifying head H2 and the re-verifying head H4 may read the servo signal of the magnetic tape MT twice, regardless of the presence of the writing error. In this case, the servo signal inspection section 17 repeats the inspecting operations in accordance with the number of the reading, thus further improving the reliability of operations of writing the servo signal on the magnetic tape MT.

Furthermore, note that the overwrite head H3 overwrites the servo signal for each pattern block B, but can overwrite only the part of the writing error if patterns of the servo signal are of an allowable type.

From the aforementioned explanation, those skilled in the art ascertain the essential characteristics of the present invention and can make the various modifications and variations to the present invention to adapt it to various usages and conditions without departing from the spirit and scope of the claims.

What is claimed is:

1. A servo writer for writing a servo signal on a tape, the servo writer including a supply reel for feeding the tape, and a take-up reel for winding the tape, the servo writer comprising:
    a write head for writing the servo signal on the tape;
    a verifying head for reading the servo signal written by the write head in order to inspect the servo signal, the verifying head being positioned downstream of the write head in a transport direction of the tape;
    an inspection section for checking whether or not the servo signal being read by the verifying head contains an abnormality;
    an overwrite head for overwriting, with a new servo signal, a portion where the abnormality is detected by the inspection section, the overwrite head being disposed adjacent to the verifying head in a downstream direction of the transport direction of the tape; and
    an overwrite controller for determining timing of overwriting the servo signal, based on the transport speed of the tape and a distance between the verifying head and the overwrite head,
    wherein the overwrite head overwrites the servo signal under control of the overwrite controller, and
    wherein the overwrite controller comprises a phase compensation circuit which monitors the phase of the servo signal written on the magnetic tape upon receiving a new pattern block from the servo signal inspection section, confirms that the phase of the written servo signal reaches a predetermined phase and delivers a control signal to the servo signal output section so as to send a new pattern block to the overwrite head.

2. The servo writer according to claim 1, further comprising:
    a re-verifying head for reading the servo signal written by the overwrite head in order to inspect the servo signal, the re-verifying head being positioned downstream of the overwrite head in the transport direction of the tape; and
    a re-inspection section for checking whether or not the servo signal being read by the re-verifying head contains an abnormality.

3. The servo writer according to claim 2, wherein the write head, the verifying head and the overwrite head are integrated.

4. The servo writer according to claim 3,
    wherein the servo signal includes a plurality of pattern blocks, and
    wherein the servo signal is written on the tape for each of multiple pattern blocks, and when the inspection section detects an abnormality from the servo signal, the overwrite head overwrites only a pattern block out of the pattern blocks, where the abnormality is detected.

5. The servo writer according to claim 2,
    wherein the servo signal includes a plurality of pattern blocks, and
    wherein the servo signal is written on the tape for each of the pattern blocks, and when the inspection section detects an abnormality from the servo signal, the overwrite head overwrites only a pattern block out of the pattern blocks, where the abnormality is detected.

6. The servo writer according to claim 2, further comprising a plurality of capstan rollers located upstream of the write head and downstream of the overwrite head in the transport direction of the tape.
    wherein the transport speed of the tape is determined by measuring a rotation speed of the capstan rollers.

7. The servo writer according to claim 1, wherein the write head, the verifying head and the overwrite head are integrated.

8. The servo writer according to claim 7,
    wherein the servo signal includes a plurality of pattern blocks, and
    wherein the servo signal is written on the tape for each of the pattern blocks, and when the inspection section detects an abnormality from the servo signal, the overwrite head overwrites only a pattern block out of the pattern blocks, where the abnormality is detected.

9. The servo writer according to claim 1,
    wherein the servo signal includes a plurality of pattern blocks, and
    wherein the servo signal is written on the tape for each of the pattern blocks, and when the inspection section detects an abnormality from the servo signal, the overwrite head overwrites only a pattern block out of the pattern blocks, where the abnormality is detected.

10. The servo writer according to claim 1, further comprising a plurality of capstan rollers located upstream of the write head and downstream of the overwrite head in the transport direction of the tape,
    wherein the transport speed of the tape is determined by measuring a rotation speed of the capstan rollers.

11. The servo writer according to claim 1, wherein the overwrite head is disposed immediately next to the verifying head in a downstream direction of the transport direction of the tape.

12. The servo writer according to claim 1, wherein the overwrite head directly overwrites the servo signal written by the write head.

* * * * *